(12) United States Patent  (10) Patent No.: US 12,479,706 B2
Song et al.  (45) Date of Patent: Nov. 25, 2025

(54) WAREHOUSE SHUTTLE

(71) Applicant: BEIJING JINGDONG QIANSHI TECHNOLOGY CO., LTD., Beijing (CN)

(72) Inventors: Guoku Song, Beijing (CN); Xu Liu, Beijing (CN); Zongjing Yu, Beijing (CN); Weiquan He, Beijing (CN)

(73) Assignee: BEIJING JINGDONG QIANSHI TECHNOLOGY CO., LTD, Beijing (CN)

( * ) Notice: Subject to any disclaimer, the term of this patent is extended or adjusted under 35 U.S.C. 154(b) by 314 days.

(21) Appl. No.: 18/003,699

(22) PCT Filed: May 11, 2021

(86) PCT No.: PCT/CN2021/092993
§ 371 (c)(1),
(2) Date: Dec. 29, 2022

(87) PCT Pub. No.: WO2022/001377
PCT Pub. Date: Jan. 6, 2022

(65) Prior Publication Data
US 2023/0257243 A1  Aug. 17, 2023

(30) Foreign Application Priority Data
Jun. 30, 2020 (CN) .......................... 202010612746.3

(51) Int. Cl.
*B66F 9/18* (2006.01)
*B66F 9/20* (2006.01)
(52) U.S. Cl.
CPC . *B66F 9/18* (2013.01); *B66F 9/20* (2013.01)
(58) Field of Classification Search
CPC ..................................... B66F 9/18; B66F 9/20
See application file for complete search history.

(56) References Cited

U.S. PATENT DOCUMENTS 11,790,295 B1 * 10/2023 Theobald ................. B65G 1/10
                                                          700/218
12,227,218 B1 * 2/2025 Clarke .................... B66F 9/063
(Continued)

FOREIGN PATENT DOCUMENTS

AU  2011308863 A1  4/2013
CN  103153822 A    6/2013
(Continued)

OTHER PUBLICATIONS

"International Search Report and Written Opinion of the International Searching Authority with English language translation", International Application No. PCT/CN2021/092993, Jul. 16, 2021, 16 pp.
(Continued)

*Primary Examiner* — Saul Rodriguez
*Assistant Examiner* — Ashley K Romano
(74) *Attorney, Agent, or Firm* — Myers Bigel, P.A.

(57) ABSTRACT

The present disclosure relates to a warehouse shuttle. The warehouse shuttle comprises: a vehicle body; a first arm mounted to the vehicle body; a second arm mounted to the vehicle body and arranged spaced apart from the first arm; a first carrying member arranged between the first arm and the second arm to carry articles between the first arm and the second arm; a first flexible drive part comprising a first flexible transmission member, the first flexible transmission member being connected to the second arm to cause the second arm to move relative to the first arm; and a second flexible drive part comprising a second flexible transmission member, the second flexible transmission member being connected to the first carrying member to cause the first carrying member to move relative to the first arm. By adopting the technical solution of the present disclosure, both the second arm and the first carrying member are driven (Continued)

by the flexible drive parts, which improves the problem of many articulation points and a complex structure due to connecting an intermediate support plate to arms by a linkage mechanism in the prior art.

8 Claims, 4 Drawing Sheets

(56) References Cited

U.S. PATENT DOCUMENTS

| | | | |
|---|---|---|---|
| 2012/0099953 | A1 | 4/2012 | Hortig et al. |
| 2015/0081089 | A1 | 3/2015 | Kapust et al. |
| 2018/0022547 | A1 | 1/2018 | Wehner et al. |
| 2018/0339858 | A1 | 11/2018 | Iwata et al. |
| 2021/0139240 | A1 | 5/2021 | Kapust et al. |
| 2022/0348445 | A1* | 11/2022 | Chou ................. B66F 9/20 |
| 2022/0371866 | A1* | 11/2022 | Wada ............. B65G 1/0414 |
| 2022/0411245 | A1* | 12/2022 | Bailey ............... B66F 9/087 |
| 2023/0069056 | A1* | 3/2023 | Zahdeh ............. B66F 9/063 |
| 2023/0150807 | A1* | 5/2023 | Nguyen ............. B66F 9/18 294/207 |
| 2023/0271775 | A1* | 8/2023 | Allen ............. B65G 63/004 |
| 2023/0294968 | A1* | 9/2023 | Kondo ............... B66F 9/18 414/592 |
| 2023/0406683 | A1* | 12/2023 | King .................. B66F 9/18 |
| 2024/0425335 | A1* | 12/2024 | Shen ................. B66F 9/065 |

FOREIGN PATENT DOCUMENTS

| | | |
|---|---|---|
| CN | 204937240 U | 1/2016 |
| CN | 107161584 A | 9/2017 |
| CN | 206615642 U | 11/2017 |
| CN | 206679679 U | 11/2017 |
| CN | 108068169 A | 5/2018 |
| CN | 210213649 U | 3/2020 |
| CN | 112298880 A | 2/2021 |
| CN | 212607325 U | 2/2021 |
| DE | 4111523 A1 | 10/1992 |
| JP | 2019142723 A | 8/2019 |
| WO | 2012044734 A1 | 4/2012 |

OTHER PUBLICATIONS

"First Examination Opinion Notification with English language translation", CN Application No. 202010612746.3, Nov. 26, 2024, 18 pp.
"Communication with Supplementary European Search Report", EP Application No. 21833250.0, May 6, 2024, 9 pp.
Notice of Reasons for Refusal and English language translation, JP Application No. 2022-580983, Jun. 10, 2025, 10 pp.
"Decision to Grant a Patent with English translation", JP Application No. 2022-580983, Oct. 7, 2025, 6 pp.

\* cited by examiner

WAREHOUSE SHUTTLE

CROSS-REFERENCE TO RELATED APPLICATIONS

The present application is a U.S. National Stage Application under 35 U.S.C. § 371 of International Patent Application No. PCT/CN2021/092993, filed on May 11, 2021, which is based on and claims priority to CN application No. CN202010612746.3, filed on Jun. 30, 2020, the disclosures of both of which are hereby incorporated by reference in their entireties.

FIELD OF THE DISCLOSURE

The present disclosure relates to the field of logistics equipment, in particular to a warehouse shuttle.

BACKGROUND OF THE DISCLOSURE

A multi-layer shuttle stereoscopic warehouse articles-to-person system, i.e., a "multiple shuttle system" is a small-package articles-to-person system developed independently to cope with e-commerce logistics. This system greatly improves human effectiveness and area effectiveness as compared with traditional warehousing, and is an important part of the articles-to-person picking mode. Multi-layer shuttles include fixed-pitch shuttles and variable-pitch shuttles. The fixed-pitch shuttles can only be used for storing and taking articles of fixed sizes. The variable-pitch shuttles can be used for storing and taking articles of various sizes due to adjustable spacing between arms, and are generally used for storing and taking articles in original packages. If an original package is too large in width and weight, the bottom of the package is liable to sink when the passage is pulled to or pushed from the shuttle, causing frequent abrasion of the bottom of the package, and a package intermediate support plate at both ends of a loading area of the shuttle, and rails along which the shuttle travels, resulting in damage to the bottom of the package.

FIG. 1 shows a structure diagram of a variable-pitch shuttle of the related art. The variable-pitch shuttle includes a fixed arm 1, a moving arm 2 spaced apart from the fixed arm 1, and an intermediate support plate 3 arranged between the fixed arm 1 and the moving arm 2. The intermediate support plate 3 is used to support the middle of a package. The variable-pitch shuttle further includes a screw rod connected to the fixed arm 1 and a threaded sleeve in threaded fit with the screw rod. The threaded sleeve is connected to the moving arm 2, and during rotation of the screw rod, the threaded sleeve moves along the screw rod, thereby causing the moving arm 2 to move relative to the fixed arm 1. Using a symmetrically arranged linkage mechanism 4 of a vehicle body, the intermediate support plate 3 and moving arm 2 move together, and their moving distances remain in a relationship of a 1 to 2 ratio, such that the intermediate support plate 3 is always located midway between the moving arm 2 and the fixed arm 1 to support the middle of the package, thus avoiding abrasion and damage due to sinking of the middle of the package.

The variable-pitch shuttle further includes a first support plate 5 connected to the fixed arm 1 and a second support plate 6 connected to the moving arm 2. Both the first support plate 5 and the second support plate 6 are used to carry the package. The linkage mechanism 4 connects the first support plate 5, the second support plate 6 and the intermediate support plate 3 together.

During movement of the moving arm 2, as the screw rod is arranged on one side of the vehicle body, the moving arm 2 is not evenly stressed and the transmission is not smooth when the moving arm 2 is driven into motion, such that when the moving arm 2 moves on guide shafts on both sides, jamming is liable to occur, resulting in a crawling phenomenon; in addition, as the intermediate support plate is connected to the arms by the linkage mechanism 4, the structure has too many articulation points, is complex in structure and generates a large noise.

SUMMARY OF THE DISCLOSURE

The present disclosure aims to provide a warehouse shuttle to improve the problem of many articulation points and a complex structure due to connecting an intermediate support plate to arms by a linkage mechanism in the prior art.

According to an aspect of embodiments of the present disclosure, there is provided a warehouse shuttle, the warehouse shuttle including:
- a vehicle body;
- a first arm mounted to the vehicle body;
- a second arm mounted to the vehicle body and arranged spaced apart from the first arm;
- a first carrying member arranged between the first arm and the second arm to carry articles between the first arm and the second arm;
- a first flexible drive part including a first flexible transmission member, the first flexible transmission member being connected to the second arm to cause the second arm to move relative to the first arm; and
- a second flexible drive part including a second flexible transmission member, the second flexible transmission member being connected to the first carrying member to cause the first carrying member to move relative to the first arm In some embodiments,
- the first flexible drive part further includes a first driving wheel mounted to a side of the vehicle body adjacent to the first arm, and a first driven wheel mounted to a side of the vehicle body adjacent to the second arm, the first flexible transmission member being wound on the first driving wheel and the first driven wheel; and
- the second flexible drive part further includes a second driving wheel mounted to the side of the vehicle body adjacent to the first arm and a second driven wheel mounted to the side of the vehicle body adjacent to the second arm, the second flexible transmission member being wound on the second driving wheel and the second driven wheel.

In some embodiments, the warehouse shuttle further includes a rotating shaft, the first driving wheel and the second driving wheel being both mounted to the rotating shaft, a ratio of the diameters of the first driving wheel and the second driving wheel being 2 to 1.

In some embodiments, the vehicle body includes:
- a first box arranged on a side of the first arm away from the second arm, to arrange therein the rotating shaft and the first driving wheel and the second driving wheel mounted to the rotating shaft; and
- a second box arranged on a side of the second arm away from the first arm, to mount the first driven wheel and the second driven wheel thereto.

In some embodiments, two first flexible drive parts are symmetrically arranged on two sides of a center line of the warehouse shuttle.

In some embodiments, two second flexible drive parts are symmetrically arranged on the two sides of the center line of the warehouse shuttle.

In some embodiments,
the first flexible transmission member includes a transmission belt; and/or
the second flexible transmission member includes a transmission belt.

In some embodiments, the warehouse shuttle further includes:
a second carrying member connected to the first arm to carry the articles between the first arm and the second arm; and
a third carrying member connected to the second arm to carry the articles between the first arm and the second arm.

In some embodiments,
the first arm includes a first arm body connected to the first flexible transmission member, and a first moving member movable relative to the first arm body to extend to an outer side of the vehicle body; and
the second arm includes a second arm body connected to the second flexible transmission member, and a second moving member movable relative to the second arm body to extend to an outer side of the vehicle body.

In some embodiments, the warehouse shuttle further includes:
a first shifting arm rotatably mounted to the first moving member to switch between a first position in which the first shifting arm is parallel with the first moving member and a second position in which the second shifting arm is perpendicular to the first moving member; and
a second shifting arm rotatably mounted to the second moving member to switch between a first position in which the second shifting arm is parallel with the second moving member and a second position in which the second shifting arm is perpendicular to the second moving member.

By adopting the technical solution of the present disclosure, both the second arm and the first carrying member are driven by the flexible drive parts, which improves the problem of many articulation points and a complex structure due to connecting an intermediate support plate to arms by a linkage mechanism in the prior art.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

The drawings as a part of the present disclosure are used to provide further understanding of the present disclosure. Illustrative embodiments of the present disclosure and description thereof are used for explaining the present disclosure but do not improperly limit the present disclosure. In the drawings.

REFERENCE NUMERALS

1, first flexible drive part; 2, second flexible drive part; 3, transmission mechanism; 4, drive motor; 5, rotating shaft; 6, first mounting seat; 7, first carrying member; 8, second arm; 9, first box; 10, first driving wheel; 11, first driven wheel; 12, first flexible transmission member; 13, second mounting seat; 14, first connecting member; 15, second driving wheel; 16, second driven wheel; 17, second flexible transmission member; 18, third mounting seat; 19, second connecting member; 20, second box; 21, guide shaft; 22, second carrying member; 23, first arm; 24, third carrying member; 25, first shifting arm.

DETAILED DESCRIPTION OF THE PREFERRED EMBODIMENTS

Technical solutions in the embodiments of the present disclosure will be described below clearly and completely in conjunction with the accompanying drawings in the embodiments of the present disclosure. Obviously, the described embodiments are only part of, instead of all of the embodiments of the present disclosure. The following description of at least one exemplary embodiment is actually only illustrative, and in no way serves as any limitation on the present disclosure and its application or use. Based on the embodiments in the present disclosure, all of other embodiments obtained by a person of ordinary skill in the art without creative work should fall into the protection scope of the present disclosure.

Figure 1:
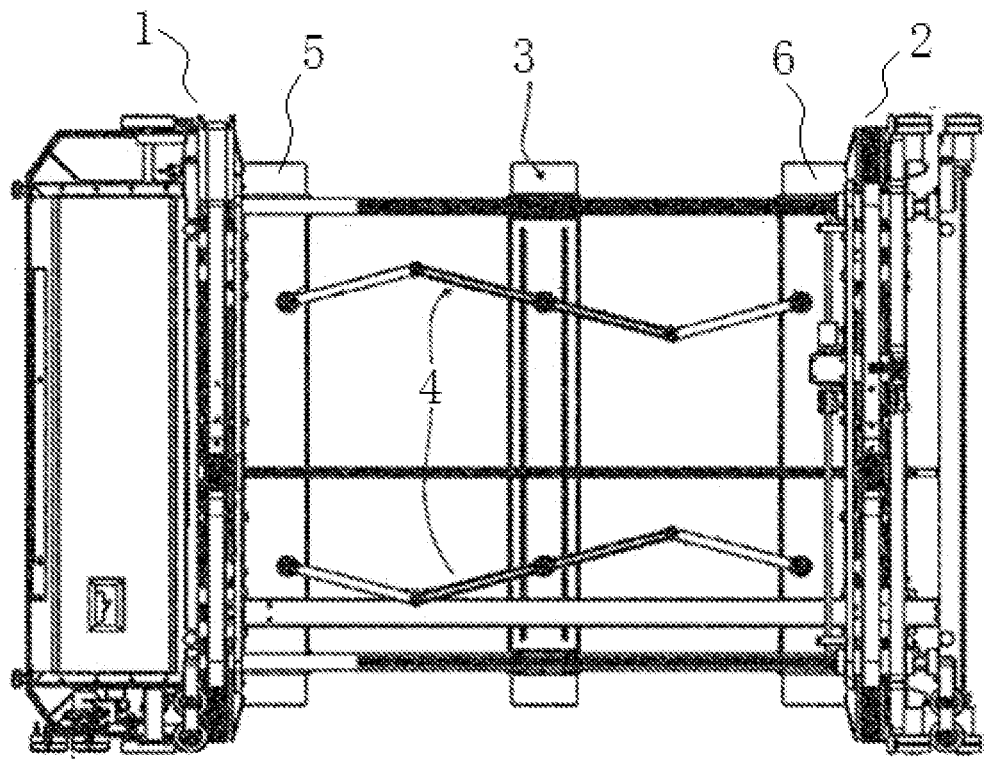
FIG. 1 shows a structure diagram of a variable-pitch shuttle of the related art.
Figure 2:
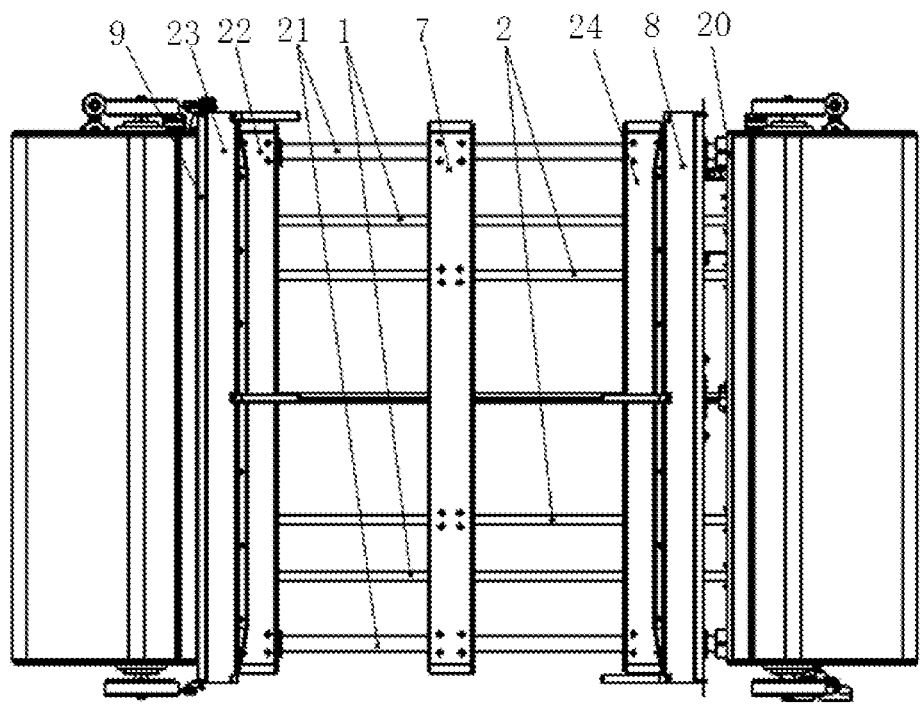
FIG. 2 shows a structure diagram of a warehouse shuttle of an embodiment of the present disclosure.
Figure 3:
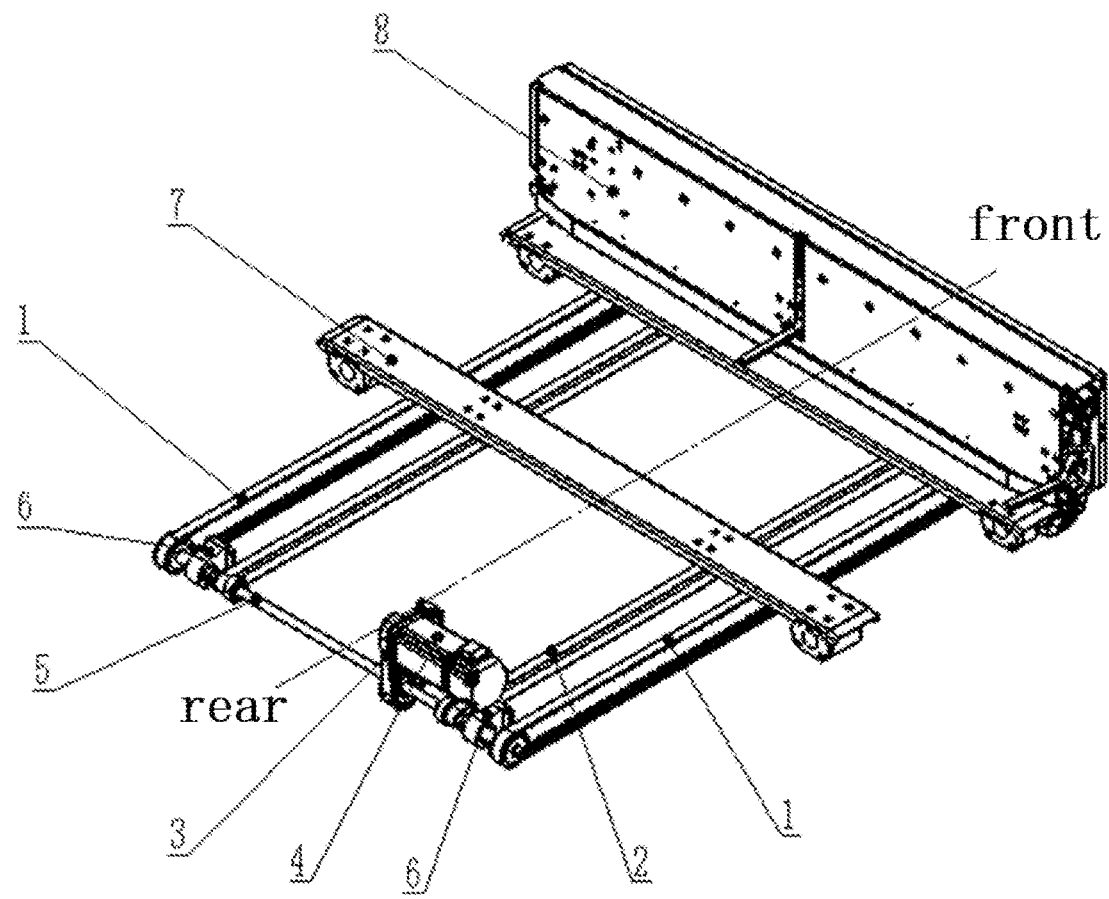
FIG. 3 shows an internal structure diagram of the warehouse shuttle of an embodiment of the present disclosure.

FIG. 2 shows a structure diagram of a warehouse shuttle of this embodiment, and FIG. 3 shows an internal structure diagram of the warehouse shuttle of this embodiment.

As shown in FIGS. 2 to 3, in this embodiment, the warehouse shuttle includes a vehicle body, a first arm 23, a second arm 8, a first carrying member 7, a first flexible drive part 1, and a second flexible drive part 2.

The first arm 23 is mounted to the vehicle body; the second arm 8 is mounted to the vehicle body and arranged spaced apart from the first arm 23; and the first carrying member 7 is arranged between the first arm 23 and the second arm 8 to carry articles between the first arm 23 and the second arm 8.

Figure 4:
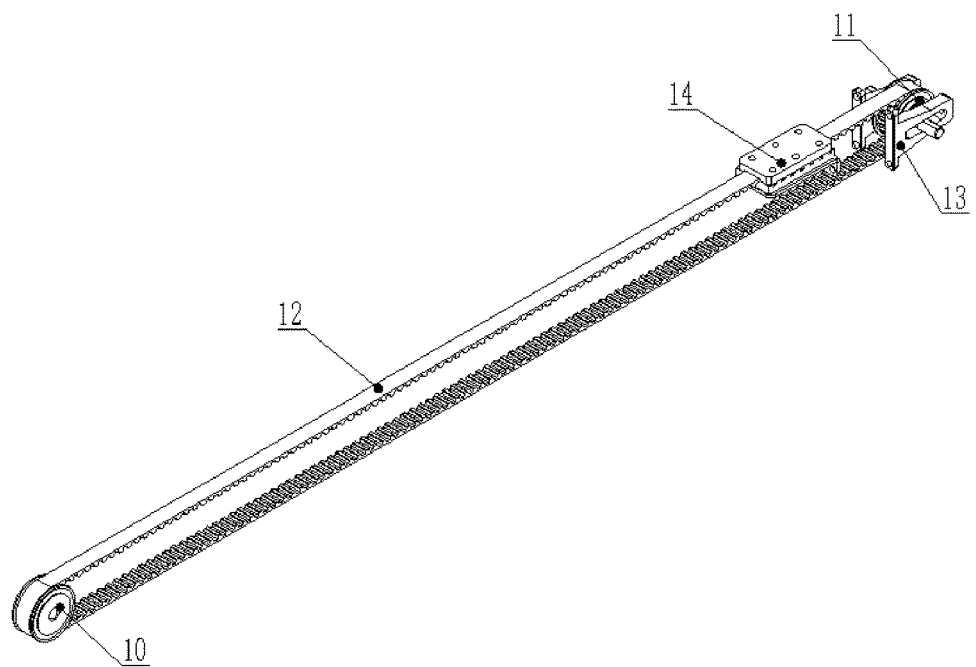
FIG. 4 shows a structure diagram of a first flexible drive part of an embodiment of the present disclosure.

FIG. 4 shows a structure diagram of the first flexible drive part of this embodiment. As shown in FIG. 4, the first flexible drive part 1 includes a first flexible transmission member 12, the first flexible transmission member 12 being connected to the second arm 8 to cause the second arm 8 to move relative to the first arm 23.

The first flexible drive part 1 further includes a first driving wheel 10 mounted to a side of the vehicle body adjacent to the first arm 23, and a first driven wheel 11 mounted to a side of the vehicle body adjacent to the second arm 8, the first flexible transmission member 12 being wound on the first driving wheel 10 and the first driven wheel 11.

The first flexible transmission member 12 is provided with a first connecting member 14 for connecting the second arm 8.

Figure 5:
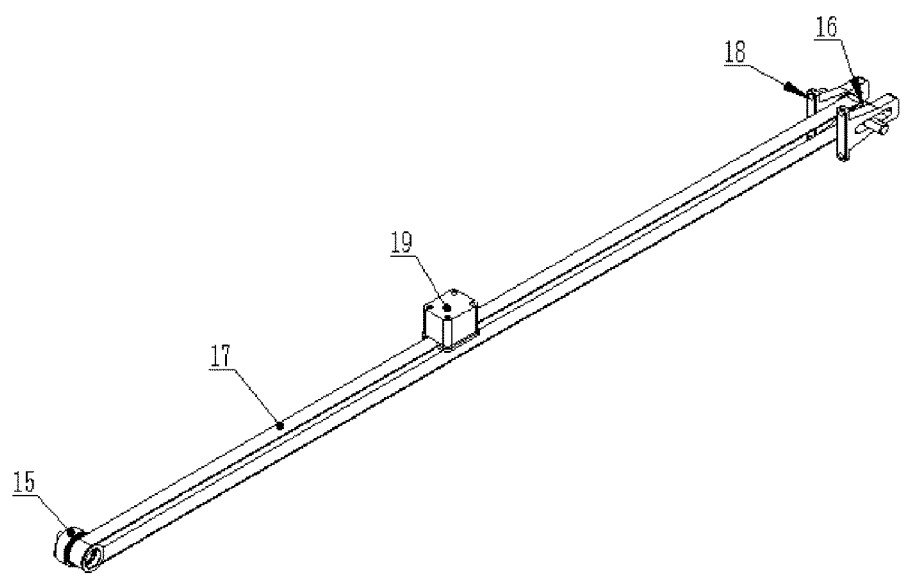
FIG. 5 shows a structure diagram of a second flexible drive part of an embodiment of the present disclosure.

FIG. 5 shows a structure diagram of the second flexible drive part of this embodiment. As shown in FIG. 5, the second flexible drive part 2 includes a second flexible transmission member 17, the second flexible transmission member 17 being connected to the first carrying member 7 to cause the first carrying member 7 to move relative to the first arm 23.

The second flexible drive part 2 further includes a second driving wheel 15 mounted to the side of the vehicle body adjacent to the first arm 23 and a second driven wheel 16 mounted to the side of the vehicle body adjacent to the second arm 8, the second flexible transmission member 17 being wound on the second driving wheel 15 and the second driven wheel 16.

The second flexible transmission member 17 is provided with a second connecting member 19 for connecting the first carrying member 7.

In some embodiments, the first flexible transmission member 12 includes a transmission belt, and preferably, the transmission belt includes a synchronous belt. The second flexible transmission member 17 includes a transmission belt, and preferably, the transmission belt includes a synchronous belt.

The warehouse shuttle further includes a rotating shaft 5, the first driving wheel 10 and the second driving wheel 15 being both mounted to the rotating shaft 5, a ratio of the diameters of the first driving wheel 10 and the second driving wheel 15 being 2 to 1.

Since the first driving wheel 10 and the second driving wheel 15 are mounted to the same rotating shaft 5, angular velocities of the first driving wheel 10 and the second driving wheel 15 are certainly the same, and as the ratio of the diameters of the first driving wheel 10 and the second driving wheel 15 is 2 to 1, a ratio of linear velocities of the first flexible transmission member 12 and the second flexible transmission member 17 is 2 to 1, and thus a ratio of movement velocities of the second arm 8 and the first carrying member 7 is 2 to 1.

In some embodiments, the first carrying member 7 is located midway between the first arm 23 and the second arm 8. The distance between the first carrying member 7 and the first arm 23 is equal to the distance between the first carrying member 7 and the second arm 8.

Since the ratio of the movement velocities of the second arm 8 and the first carrying member 7 is 2 to 1, the first carrying member 7 can always remain in an intermediate position between the first arm 23 and the second arm 8.

the vehicle body includes a first box 9 and a second box 20. The first box 9 is arranged on a side of the first arm 23 away from the second arm 8, to arrange therein the rotating shaft 5 and the first driving wheel 10 and the second driving wheel 15 mounted to the rotating shaft 5.

Inside the first box 9 are also arranged a drive motor 4 and a transmission mechanism 3 that transmits power to the rotating shaft 5. The first driving wheel 10 and the second driving wheel 15 are both mounted to the rotating shaft 5, and the rotating shaft 5 is mounted in the first box 9 by means of a first mounting seat 6.

The second box 20 is arranged on a side of the second arm 8 away from the first arm 23, to mount the first driven wheel 11 and the second driven wheel 16 thereto.

Figure 6:
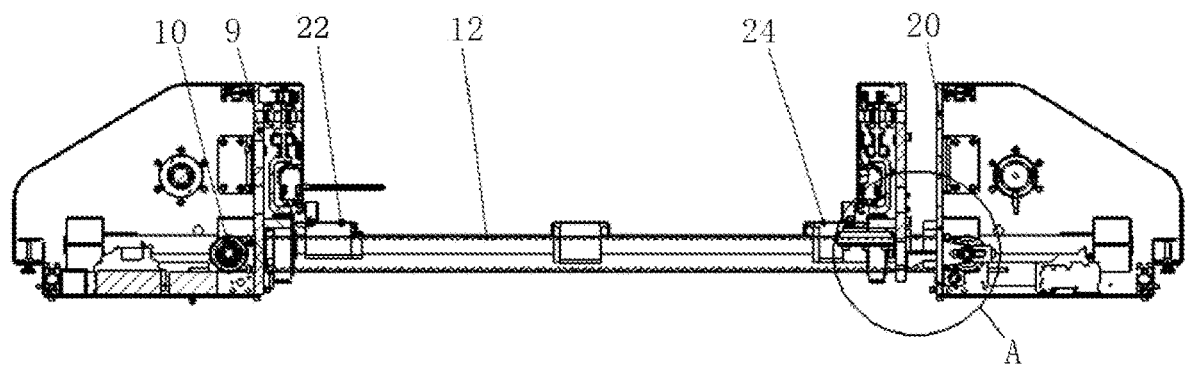
FIG. 6 shows a cross-sectional structure diagram of the warehouse shuttle of an embodiment of the present disclosure at a first location.
Figure 7:
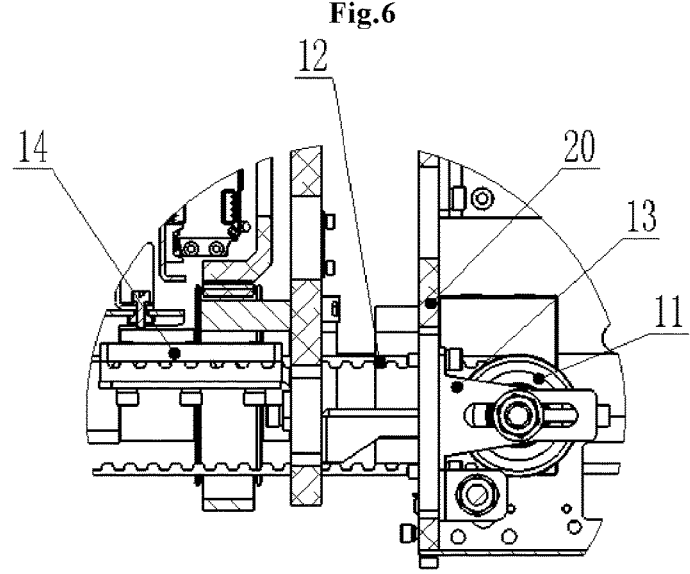
FIG. 7 shows an enlarged view at A in FIG. 6.

In conjunction with FIGS. 4, 6 and 7, the first driven wheel 11 is mounted to the second box 20 by means of a second mounting seat 13.

Figure 8:
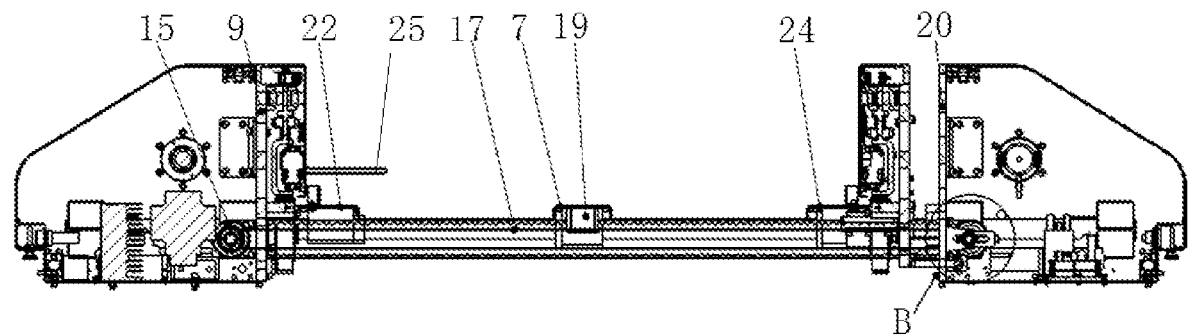
FIG. 8 shows a cross-sectional structure diagram of the warehouse shuttle of an embodiment of the present disclosure at a second location.
Figure 9:
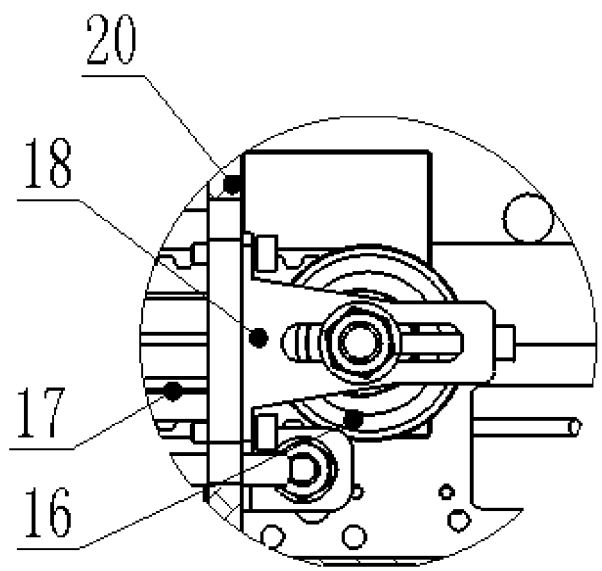
FIG. 9 shows an enlarged view at B in FIG. 8.

In conjunction with FIGS. 5, 8 and 9, the second driven wheel 16 is mounted to the second box 20 by means of a third mounting seat 18.

In conjunction with FIGS. 2, 3, 6 and 8, in this embodiment, the first box 9 and the second box 20 are arranged side by side in a traveling direction of the warehouse shuttle. The second box 20 is located in front of the first box 9 in the traveling direction of the warehouse shuttle.

In this embodiment, the warehouse shuttle further includes a guide shaft 21. The guide shaft 21 is configured to guide the first carrying member 7 and/or the second arm 8 to move relative to the first arm. Two guide shafts 21 are provided, and the two guide shafts 21 are symmetrically arranged on two sides of a center line of the warehouse shuttle.

Two first flexible drive parts 1 are symmetrically arranged on the two sides of the center line of the warehouse shuttle, so that the second arm 8 is evenly stressed during movement, which is conducive to smooth movement of the second arm 8 relative to the first arm 23, and prevents jamming during movement of the second arm 8.

Two second flexible drive parts 2 are symmetrically arranged on the two sides of the center line of the warehouse shuttle, so that the first carrying member 7 is evenly stressed during movement, which is conducive to smooth movement of the first carrying member 7 relative to the first arm 23, and prevents jamming during movement of the first carrying member 7.

The warehouse shuttle further includes a second carrying member 22 and a third carrying member 24. The second carrying member 22 is connected to the first arm 23 to carry the articles between the first arm 23 and the second arm 8. The second carrying member 22 is located on an inner side of the first arm 23.

The third carrying member 24 is connected to the second arm 8 to carry the articles between the first arm 23 and the second arm 8. The third carrying member is arranged on an inner side of the second arm 8. The third carrier part 24 moves with the second arm 8.

The second carrying member 22 and the third carrying member 24 carry two ends of the articles respectively, and the first carrying member 7 is located between the second carrying member 22 and the third carrying member 24 to carry the middle of the articles.

The first arm 23 includes a first arm body connected to the first flexible transmission member 12, and a first moving member movable relative to the first arm body to extend to an outer side of the vehicle body.

The second arm 8 includes a second arm body connected to the second flexible transmission member 17, and a second moving member movable relative to the second arm body to extend to an outer side of the vehicle body.

As shown in FIG. 8, the warehouse shuttle further includes a first shifting arm 25 and a second shifting arm. The first shifting arm 25 is rotatably mounted to the first moving member to switch between a first position in which the first shifting arm 25 is parallel with the first moving member and a second position in which the second shifting arm is perpendicular to the first moving member.

The second shifting arm is rotatably mounted to the second moving member to switch between a first position in which the second shifting arm is parallel with the second moving member and a second position in which the second shifting arm is perpendicular to the second moving member.

When the warehouse shuttle needs to take articles from a warehouse, first, both the first shifting arm 25 and the second shifting arm are adjusted to the first position, then the first moving member of the first arm 23 and the second moving member of the second arm 8 are extended to the outer side of the vehicle body and the articles are placed between the first moving member and the second moving member, then the first shifting arm 25 and the second shifting arm are adjusted to the second position to hook the articles, and finally, the first moving member and the second moving member are retracted to an inner side of the vehicle body, so as to move the articles to the vehicle body.

In this embodiment, two first flexible drive parts 1 that drive the second arm 8 to move and two second flexible drive parts 2 that drive the first carrying member 7 to move are provided, and the two first flexible drive parts 1 and the two second flexible drive parts 2 are symmetrically arranged on the two sides of the center line of the vehicle body, thereby ensuring that both the second arm 8 and the first carrying member 7 can move smoothly, to be conducive to preventing jamming during movement.

Further, as the diameter ratio of the first driving wheel 10 and the second driving wheel 15 is 2 to 1, a moving distance of the second arm 8 is twice a moving distance of the first carrying member 7, and the first carrying member 7 can always remain midway between the first arm 23 and the second arm 8, which is conducive to good carrying of the articles located between the two arms.

Described above are only exemplary embodiments of the present disclosure, which are not intended to limit the present disclosure, and all modifications, equivalent substitutions and improvements made within the spirit and principle of the present disclosure should be encompassed within the protection scope of the present disclosure.

The invention claimed is:

1. A warehouse shuttle, comprising:
a vehicle body;
a first arm mounted to the vehicle body;
a second arm mounted to the vehicle body and arranged spaced apart from the first arm;
a first carrying member arranged between the first arm and the second arm to carry articles between the first arm and the second arm;
a first flexible drive part comprising a first flexible transmission member, the first flexible transmission member being connected to the second arm to cause the second arm to move relative to the first arm; and
a second flexible drive part comprising a second flexible transmission member, the second flexible transmission member being connected to the first carrying member to cause the first carrying member to move relative to the first arm,
the first flexible drive part further comprises a first driving wheel mounted to a side of the vehicle body adjacent to the first arm, and a first driven wheel mounted to a side of the vehicle body adjacent to the second arm, the first flexible transmission member being wound on the first driving wheel and the first driven wheel;
the second flexible drive part further comprises a second driving wheel mounted to the side of the vehicle body adjacent to the first arm and a second driven wheel mounted to the side of the vehicle body adjacent to the second arm, the second flexible transmission member being wound on the second driving wheel and the second driven wheel,
the warehouse shuttle further comprises a rotating shaft, the first driving wheel and the second driving wheel being both mounted to the rotating shaft, a ratio of the diameters of the first driving wheel and the second driving wheel being 2 to 1,
the first driving wheel and the second driving wheel are installed to the same rotating shaft.

2. The warehouse shuttle according to claim 1, wherein the vehicle body comprises:
a first box arranged on a side of the first arm away from the second arm, to arrange therein the rotating shaft and the first driving wheel and the second driving wheel mounted to the rotating shaft; and
a second box arranged on a side of the second arm away from the first arm, to mount the first driven wheel and the second driven wheel thereto.

3. The warehouse shuttle according to claim 1, wherein two first flexible drive parts are symmetrically arranged on two sides of a center line of the warehouse shuttle.

4. The warehouse shuttle according to claim 1, wherein two second flexible drive parts are symmetrically arranged on the two sides of the center line of the warehouse shuttle.

5. The warehouse shuttle according to claim 1, wherein
the first flexible transmission member comprises a transmission belt; and/or
the second flexible transmission member comprises a transmission belt.

6. The warehouse shuttle according to claim 1, further comprising:
a second carrying member connected to the first arm and configured to carry the articles between the first arm and the second arm; and
a third carrying member connected to the second arm and configured to carry the articles between the first arm and the second arm.

7. The warehouse shuttle according to claim 1, wherein
the first arm comprises a first arm body connected to the first flexible transmission member, and a first moving member movable relative to the first arm body to extend to an outer side of the vehicle body; and
the second arm comprises a second arm body connected to the second flexible transmission member, and a second moving member movable relative to the second arm body to extend to an outer side of the vehicle body.

8. The warehouse shuttle according to claim 7, further comprising:
a first shifting arm rotatably mounted to the first moving member to switch between a first position in which the first shifting arm is parallel with the first moving member and a second position in which the first shifting arm is perpendicular to the first moving member; and
a second shifting arm rotatably mounted to the second moving member to switch between a first position in which the second shifting arm is parallel with the second moving member and a second position in which the second shifting arm is perpendicular to the second moving member.

* * * * *